United States Patent
Lee (10) Patent No.: US 10,979,968 B2
(45) Date of Patent: Apr. 13, 2021

(54) METHOD FOR PROCESSING SYSTEM INFORMATION FOR MACHINE-TYPE COMMUNICATION SYSTEM AND A DEVICE THEREFOR

(71) Applicant: LG Electronics Inc., Seoul (KR)

(72) Inventor: Jaewook Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/466,928

(22) PCT Filed: Nov. 7, 2017

(86) PCT No.: PCT/KR2017/012519
§ 371 (c)(1),
(2) Date: Jun. 5, 2019

(87) PCT Pub. No.: WO2018/105899
PCT Pub. Date: Jun. 14, 2018

(65) Prior Publication Data
US 2019/0349842 A1    Nov. 14, 2019

Related U.S. Application Data

(60) Provisional application No. 62/429,872, filed on Dec. 5, 2016.

(51) Int. Cl.
*H04W 48/12* (2009.01)
*H04W 4/70* (2018.01)

(52) U.S. Cl.
CPC .............. *H04W 48/12* (2013.01); *H04W 4/70* (2018.02)

(58) Field of Classification Search
None
See application file for complete search history.

(56) References Cited

U.S. PATENT DOCUMENTS

2005/0153700 A1*   7/2005   Farnsworth ........... H04W 48/16
                                                            455/446
2011/0117912 A1    5/2011   Mahajan et al.
(Continued)

FOREIGN PATENT DOCUMENTS

WO    WO2015046853    4/2015
WO    WO2016053039    4/2016
(Continued)

OTHER PUBLICATIONS

3GPP TS 36.331, vers.14.0.0 (Sep. 2016) 3rd Generation Partnership Project; Technical Specification Group Radio Access Network; Evolved Universal Terrestrial Radio Access (E-UTRA); Radio Resource Control (RRC); (Release 14) (Year: 2016).*
(Continued)

*Primary Examiner* — Jamaal Henson
(74) *Attorney, Agent, or Firm* — Fish & Richardson P.C.

(57) ABSTRACT

The present invention relates to a wireless communication system. More specifically, the present invention relates to a method and a device for processing system information for Machine-Type Communication system, the method comprising: receiving repetitions of system information for scheduling other SIBs in a first period; receiving an indicator indicating the system information for scheduling other SIBs is not changed in a second period followed by the first period in a specific time of the first period; and processing the system information for scheduling other SIBs based on the repetitions of the system information accumulated from the specific time of the first period if the system information for scheduling other SIBs is not successfully decoded at the time of end of the first period.

12 Claims, 7 Drawing Sheets

(56) References Cited

U.S. PATENT DOCUMENTS

| | | | | |
|---|---|---|---|---|
| 2014/0198726 A1* | 7/2014 | Xu | ................ | H04W 28/18 |
| | | | | 370/328 |
| 2014/0334372 A1* | 11/2014 | Vos | ................ | H04W 48/10 |
| | | | | 370/312 |
| 2015/0099528 A1* | 4/2015 | Hu | ................ | H04W 88/06 |
| | | | | 455/452.1 |
| 2015/0173089 A1* | 6/2015 | Baghel | ............ | H04W 48/12 |
| | | | | 370/329 |
| 2015/0181575 A1* | 6/2015 | Ng | ................ | H04W 72/042 |
| | | | | 370/329 |
| 2015/0327155 A1* | 11/2015 | Lee | ................ | H04W 48/12 |
| | | | | 370/329 |
| 2016/0073326 A1* | 3/2016 | Vannithamby | ........ | H04W 48/12 |
| | | | | 370/312 |
| 2016/0135124 A1* | 5/2016 | Vos | ............ | H04W 52/0216 |
| | | | | 370/311 |
| 2016/0212686 A1* | 7/2016 | Viorel | ............ | H04W 72/04 |
| 2016/0353440 A1* | 12/2016 | Lee | ............ | H04W 72/0453 |
| 2017/0105166 A1* | 4/2017 | Lee | ............ | H04W 68/005 |
| 2020/0196226 A1* | 6/2020 | Bucknell | ............ | H04W 74/006 |

FOREIGN PATENT DOCUMENTS

| | | |
|---|---|---|
| WO | WO2016182401 | 11/2016 |
| WO | WO2016186430 | 11/2016 |

OTHER PUBLICATIONS

PCT International Search Report and Written Opinion in International Application No. PCT/KR2017/012519, dated Mar. 28, 2018, 9 pages.

Panasonic, "Consideration on SIBs/RAR/paging for Rel-13 MTC," R1-144110, 3GPP TSG RAN WG1 Meeting #78bis, Ljubljana, Slovenia, Oct. 6-10, 2014, 3 pages.

3rd Generation Partnership Project; Technical Specification Group Radio Access Network; Evolved Universal Terrestrial Radio Access (E-UTRA); "Radio Resource Control (RRC); Protocol specification (Release 14)," 3GPP TS 36.331 V14.0.0, dated Sep. 2016, 644 pages, XP051172918.

Extended European Search Report in European Application No. 17878769.3, dated Jun. 30, 2020, 13 pages.

* cited by examiner

(a) Control-Plane Protocol Stack (b) User-Plane Protocol Stack

METHOD FOR PROCESSING SYSTEM INFORMATION FOR MACHINE-TYPE COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2017/012519, filed on Nov. 7, 2017, which claims the benefit of U.S. Provisional Application No. 62/429,872, filed on Dec. 5, 2016. The disclosures of the prior applications are incorporated by reference in their entirety.

TECHNICAL FIELD

The present invention relates to a wireless communication system and, more particularly, to a method for processing system information for Machine-Type Communication system and a device therefore.

BACKGROUND ART

As an example of a mobile communication system to which the present invention is applicable, a 3rd Generation Partnership Project Long Term Evolution (hereinafter, referred to as LTE) communication system is described in brief.

Figure 1:
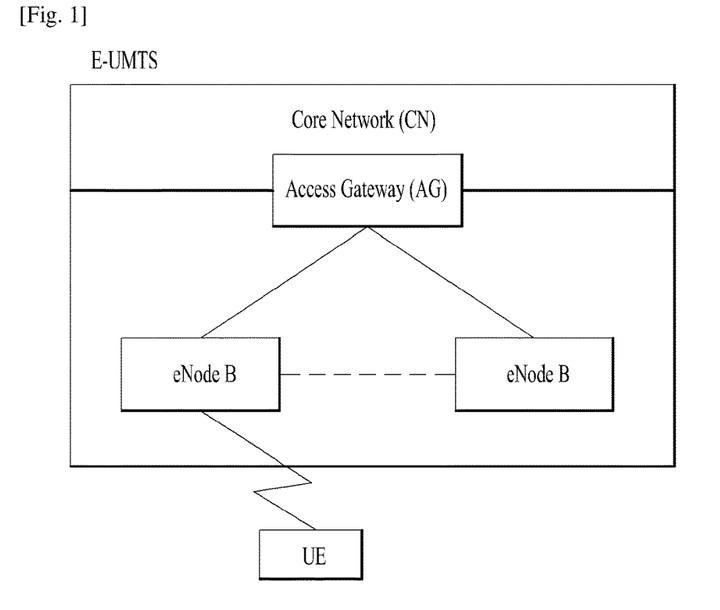
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for processing system information for Machine-Type Communication system.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

It is invented that the UE continuously accumulates repetitions of system information for scheduling other SIBs in a previous period and a next period if the system information for scheduling other SIBs is not successfully decoded when an indicator indicating the system information for scheduling other SIBs is not changed is received.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
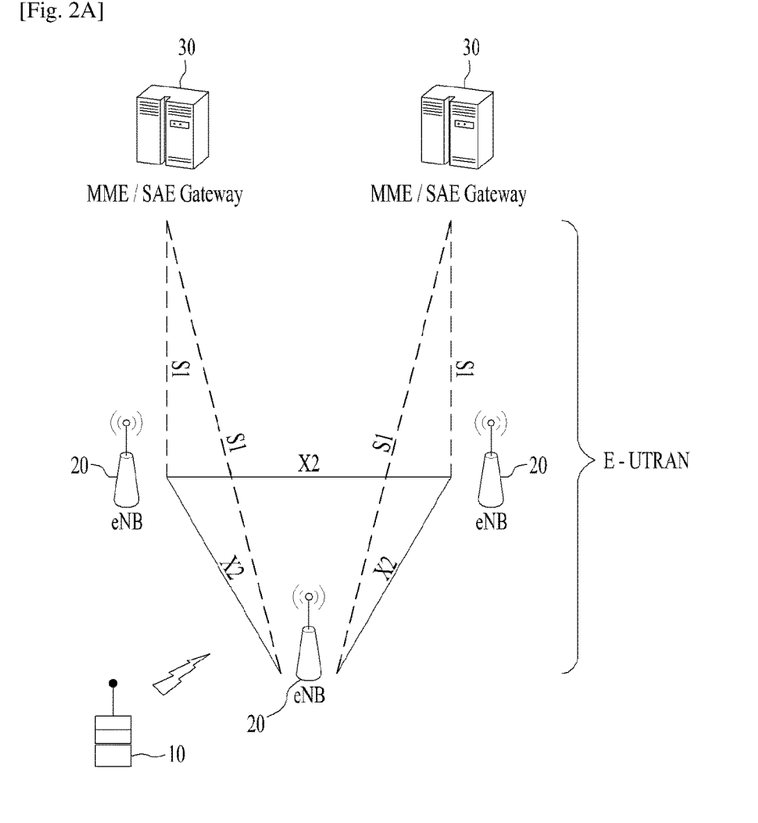
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
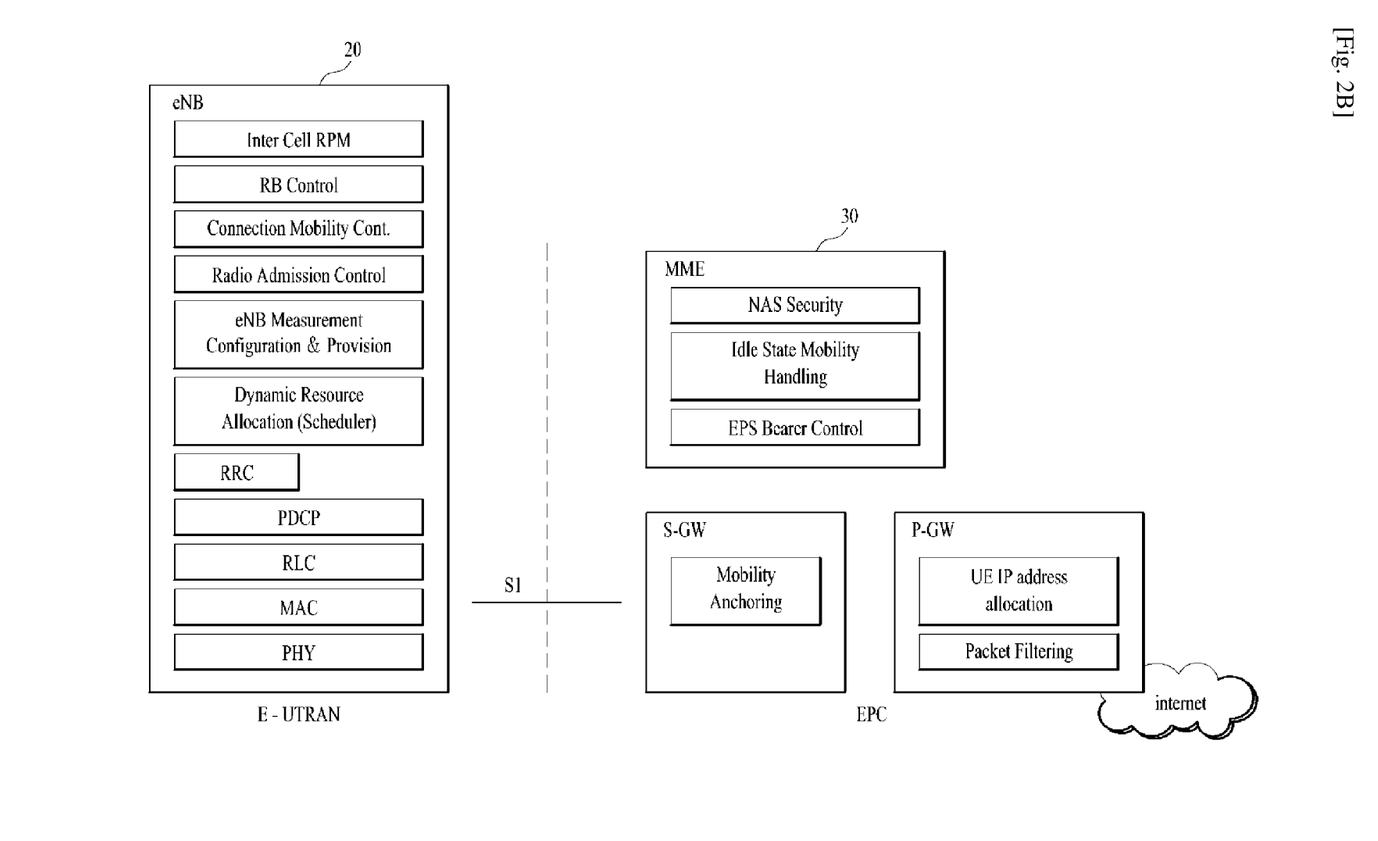
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
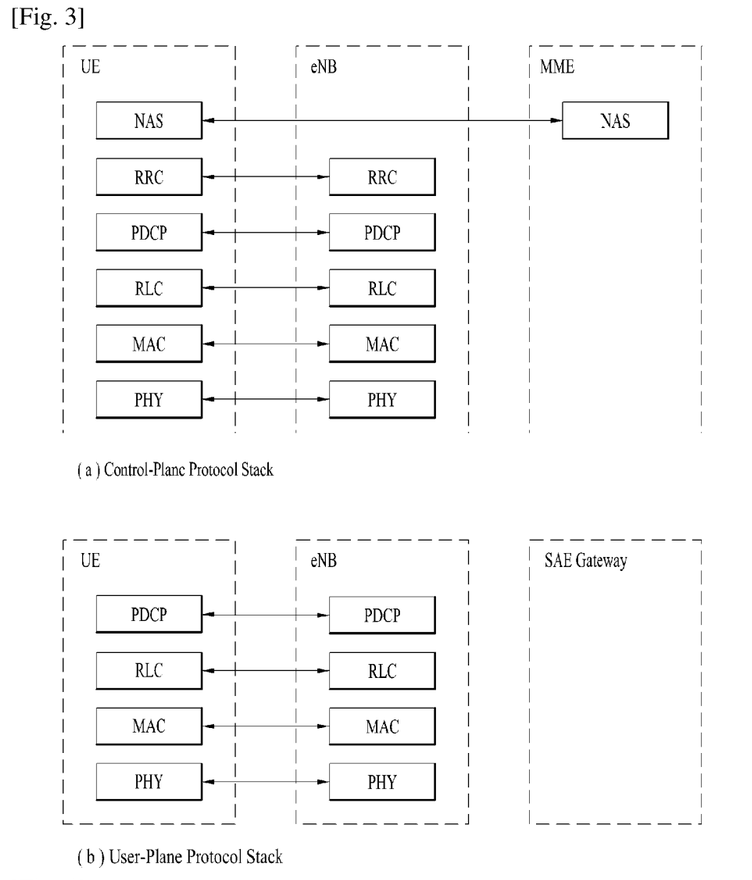
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
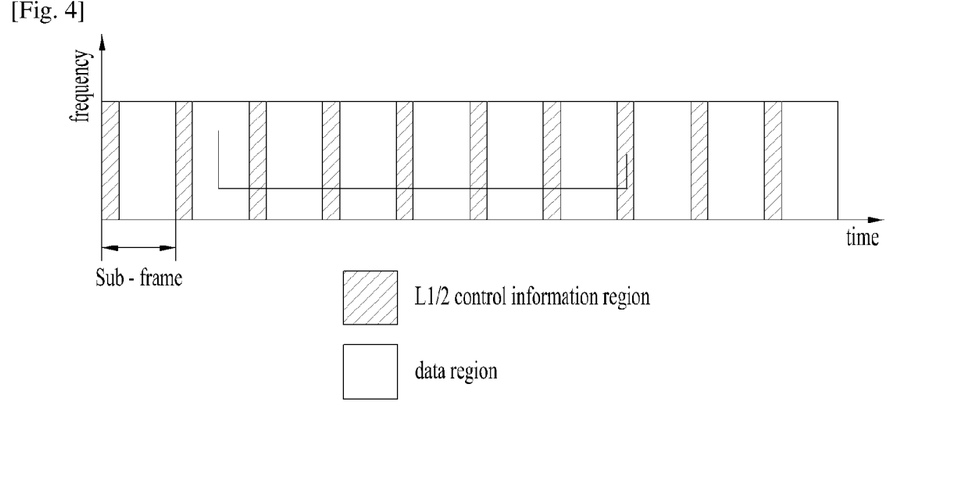
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
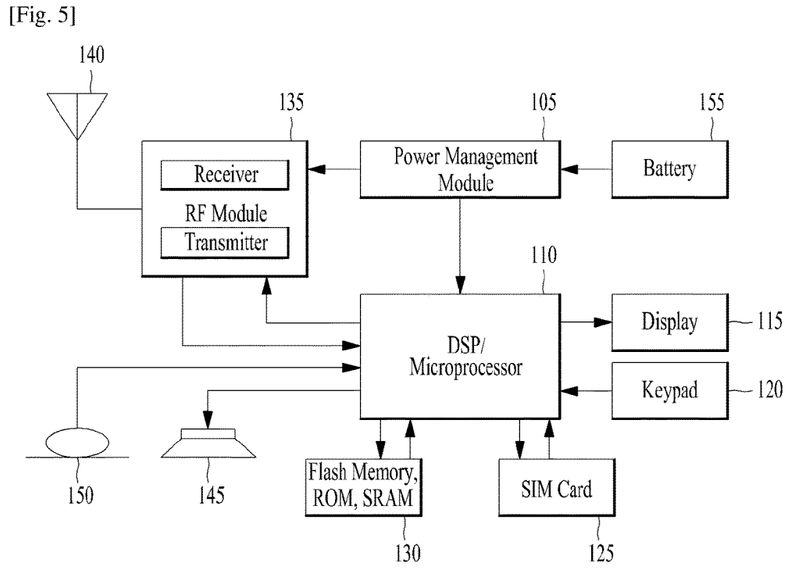
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6A:
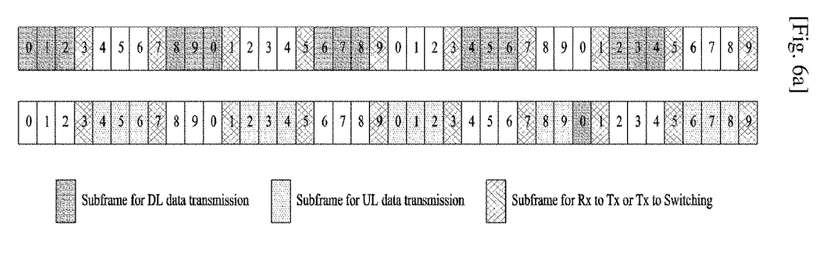
FIG. 6A is an example for data transmission and reception for a Category 0 low complexity UE.
Figure 6B:
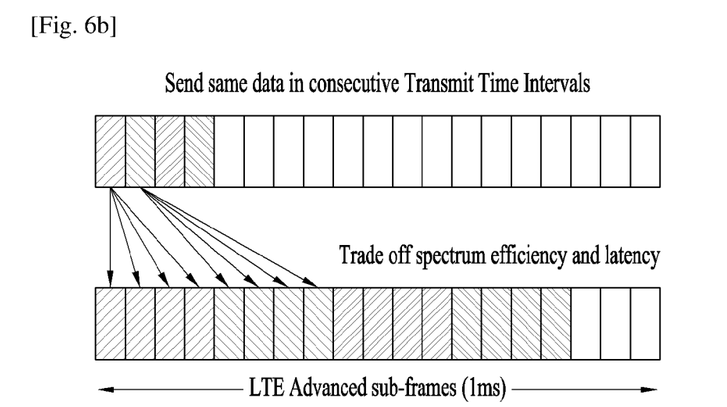
FIG. 6B is an example for repetitions for data transmission for a Category 0 low complexity UE.

FIG. 6A is an example for data transmission and reception for a Category 0 low complexity UE, and FIG. 6B is an example for repetitions for data transmission for a Category 0 low complexity UE.

Such a communication technology as MTC is specialized from 3GPP to transmit and receive IoT-based information and the MTC has a difference according to each release of the technology. Release 10 and Release 11 are focusing on a method of controlling loads of IoT (M2M) products and a method of making the loads have least influence on a network when the IoT products make a request for accessing an eNB at the same time. Release 12 and Release 13 are focusing on a low-cost technology enabling a battery to be simply implemented and very little used by reducing complicated functions mounted on a legacy smartphone as many as possible.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

In particular, a low complexity UE does not require such a function of high performance as a function of a smartphone and an amount of data used by the low complexity UE is not that big in general. Hence, there is no reason for a complicated and high-price communication module to come to the market for such a UE as the low complexity UE.

In order to manufacture a low-cost IoT (M2M) device, a concept such as UE Category 0 has been introduced. A UE category corresponds to a general figure used in 3GPP to indicate the amount of data capable of being processed by a UE in a communication modem. In general, as the amount of data to be processed is getting bigger, a price of a modem is also increasing due to a memory or performance enhancement. In case of a currently commercialized smartphone, performance of the smartphone is continuously increasing from 100 Mbps to 150 Mbps and 300 Mbps on the basis of download.

Table 1 shows UE categories used in 3GPP.

TABLE 1

| UE Category | Downlink (velocity) | Uplink (velocity) |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |

TABLE 1-continued

| UE Category | Downlink (velocity) | Uplink (velocity) |
| --- | --- | --- |
| 8 | 3 Gbps | 1.5 Gbp |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

And, since it is able to perform transmission and reception on specific time only without performing transmission and reception at the same time like FIG. 6A, it may be able to perform an operation of TDD in FDD (since transmission and reception are not performed at the same time). Additionally, unlike legacy TDD, since it is able to provide sufficient switching time as much as 1 ms to a section at which switching is performed between transmission and reception, it is able to expect a revolutionary cost reduction effect in terms of overall hardware part especially a modem and an RF. On the contrary, according to a regulation of a legacy LTE UE, it is mandatory to use at least 2 or more reception antennas.

Low complexity UEs are targeted to low-end (e.g. low average revenue per user, low data rate, delay tolerant) applications, e.g. some Machine-Type Communications.

A low complexity UE has reduced Tx and Rx capabilities compared to other UE of different categories.

A Category 0 low complexity UE may access a cell only if SIB1 indicates that access of Category 0 UEs is supported. If the cell does not support access of Category 0 UEs, the UE considers the cell as barred.

The eNB determines that a UE is a Category 0 UE based on the LCID for CCCH and the UE capability.

The S1 signalling has been extended to include the UE Radio Capability for paging. This paging specific capability information is provided by the eNB to the MME, and the MME uses this information to indicate to the eNB that the paging request from the MME concerns a low complexity UE.

A bandwidth reduced low complexity (BL) UE can operate in any LTE system bandwidth but with a limited channel bandwidth of 6 PRBs (corresponding to the maximum channel bandwidth available in a 1.4 MHz LTE system) in downlink and uplink.

To enable higher data rates a BL UE or a non-BL UE operating in enhanced coverage can optionally support a larger maximum PDSCH/PUSCH channel bandwidth of 24 or 96 PRBs in downlink, and 24 PRBs in uplink in connected mode for unicast transmission. Table 23.7.a-1 summarizes the maximum PDSCH/PUSCH bandwidth in connected mode for unicast transmission depending on the UE category and enhanced coverage mode. The maximum PDSCH/PUSCH channel bandwidth is configured separately for PDSCH and PUSCH via dedicated RRC signaling.

A Category M2 BL UE supports a larger DL and UL maximum TBS size for unicast compared to a Category M1 BL UE. A Category M1 BL UE may support a larger UL maximum TBS size indicated by a separate UE capability.

A BL UE may access a cell only if the MIB of the cell indicates that scheduling information for SIB1 specific for BL UEs is scheduled. If not, the UE considers the cell as barred.

A BL UE receives a separate occurrence of system information blocks (sent using different time/frequency resources). A BL UE has a transport block size (TBS) limited to 1000 bit for broadcast. The BL UE determines the scheduling information for SIB1 specific for BL UEs based on information in MIB. Scheduling information for other SIBs is given in SIB1 specific for BL UEs. The BCCH modification period for BL UEs is a multiple of the BCCH modification period provided in SIB2. The SIB transmission occasions within an S1-window are provided in the SIB1 specific for BL UEs. A BL UE can acquire SI messages across SI windows. The maximum number of SI messages that can be acquired across SI windows is 4. A BL UE is not required to detect SIB change when in RRC_CONNECTED.

A BL UE is paged based on paging occasions in time domain, and paging narrowbands in frequency domain. The starting subframe of a paging occasion is determined in the same way as the paging occasion in the legacy paging mechanism.

A set of PRACH resources (e.g. time, frequency, preamble), each associated with BL UEs in normal coverage, is provided in SIB. Number of PRACH repetitions and number of maximum preamble transmission attempts for BL UEs in normal coverage are provided in SIB. Time/frequency resources and repetition factor for random access response messages for BL UEs are derived from the used PRACH resources.

A UE in enhanced coverage is a UE that requires the use of enhanced coverage functionality to access the cell. In this release of the specification two enhanced coverage modes (mode A, mode B) are supported. The support of enhanced coverage mode A is mandatory for a BL UE. The maximum PDSCH/PUSCH bandwidth in connected mode for unicast transmission depends on the UE category and enhanced coverage mode as summarized in table 23.7a-1.

A UE may access a cell using enhanced coverage functionality only if the MIB of the cell indicates that scheduling information for SIB1 specific for BL UEs is scheduled. System information procedures for UEs in enhanced coverage are identical to the system information procedures for bandwidth reduced low complexity UEs. A UE capable of enhanced coverage acquires, if needed, and uses legacy system information when in normal coverage if it is not a BL UE. A UE capable of enhanced coverage acquires, if needed, and uses system information specific for UEs in enhanced coverage. A UE in enhanced coverage is not required to detect SIB change when in RRC_CONNECTED.

A set of PRACH resources (e.g. time, frequency, preamble); each associated with a coverage enhancement level, is provided in SIB. Number of PRACH repetitions and number of maximum preamble transmission attempts per coverage enhancement level are provided in SIB. UEs in same enhanced coverage level use random access resources associated with the same enhanced coverage level. Time/frequency resources and repetition factor for random access response messages for UEs in enhanced coverage are derived from the used PRACH resources.

A UE in enhanced coverage is paged using the same mechanism for paging BL UEs. The starting subframe of a paging occasion and the repetition pattern (in both time and frequency domain for downlink common control signaling) of that paging occasion are determined irrespective of the UEs enhanced coverage level.

The paging request from the MME for a UE supporting enhanced coverage functionality may contain enhanced coverage level related information and corresponding cell ID.

A UE in RRC_IDLE does not inform the network when it changes the enhanced coverage level.

A UE in enhanced coverage camps on a suitable cell where S criterion for UEs in enhanced coverage is fullfilled. The UE shall re-select to inter-frequency cells in which it is able to operate in normal coverage over cells in which it has to be in enhanced coverage.

Connected mode mobility mechanisms such as measurement reporting, network controlled handover etc., are supported for UEs in enhanced coverage. At handover from a source cell in normal or enhanced coverage mode to a target cell in enhanced coverage mode, the network may provide SIB1-BR to the UE in the handover command. No additional mechanisms are introduced to support the use of enhanced coverage functionality to access an E-UTRA cell during inter-RAT handovers.

Reconfiguration of a UE in connected mode from normal to enhanced coverage mode (and vice versa) is supported by a means of intra-cell handover or RRC configuration without handover.

In particular, discussion on a solution for a performance deterioration problem caused by decrease of output power is in progress by considering a scheme of performing repetitive transmission as shown in FIG. 6B or a TTI bundling technology previously used in VoLTE (Voice of LTE, LTE voice call service). Consequently, it might say that it is able to develop a communication module of low complexity through the low-cost IoT (M2M) technology explained in the Release 12 and the low-power IoT (M2M) technology to which the Release 13 is targeting.

Figure 7A:
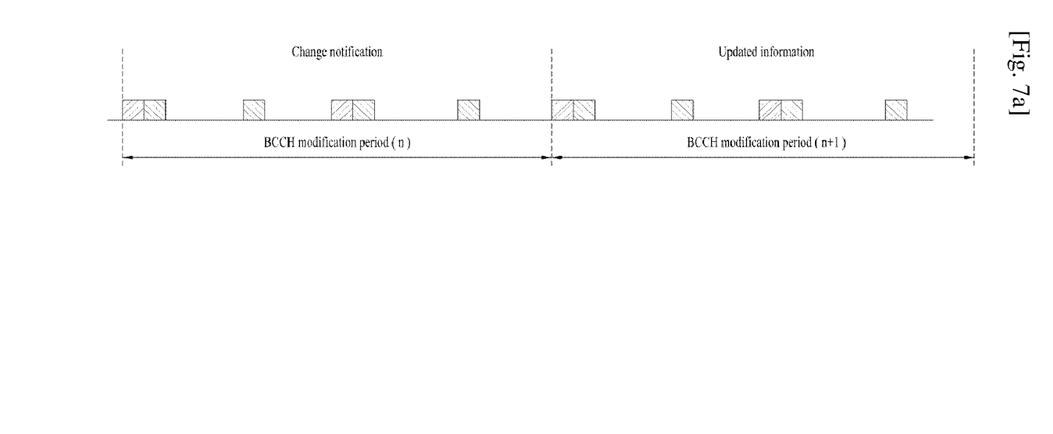
FIG. 7a is a diagram for change of system Information.
Figure 7B:
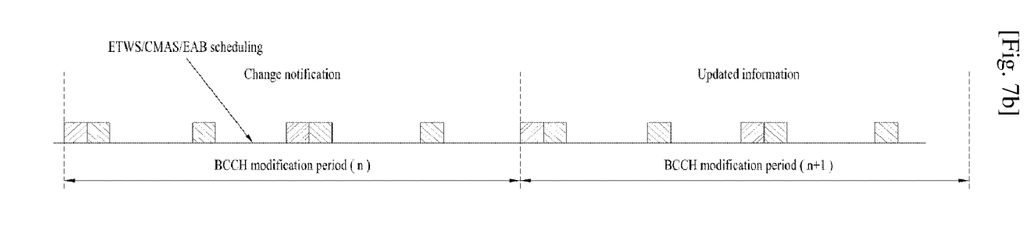
FIG. 7b is a diagram for changing of system information due to ETWS/CMAS/EAB scheduling.

FIG. 7a is a diagram for change of system information, FIG. 7b is a diagram for changing of system information due to ETWS/CMAS/EAB scheduling.

When the network changes system information, it first notifies the UEs about this change, i.e. this may be done throughout a modification period. In the next modification period, the network transmits the updated system information. These general principles are illustrated in FIG. 7a, in which different hatched indicate different system information. Upon receiving a change notification, the UE not configured to use a DRX cycle that is longer than the modification period acquires the new system information immediately from the start of the next modification period. Upon receiving a change notification applicable to eDRX, a UE in RRC_IDLE configured to use a DRX cycle that is longer than the modification period acquires the updated system information immediately from the start of the next eDRX acquisition period. The UE applies the previously acquired system information until the UE acquires the new system information. The possible boundaries of modification for SystemInformationBlockType1-BR are defined by SFN values for which SFN mod 512=0 except for notification of Earthquake and Tsunami Warning System (ETWS)/Commercial Mobile Alert Service (CMAS) for which the eNB may change SystemInformationBlockType1-BR content at any time. For NB-IoT, the possible boundaries of modification for SystemInformationBlockType1-NB are defined by SFN values for which (H-SFN*1024+SFN) mod 4096=0.

However, due to ETWS/CMAS/EAB scheduling, the contents of SystemInformationBlockType1-BR can change during this window (FIG. 7b). It is not clear how to read SystemInformationBlockType1-BR in this scenario.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR uses a schedule with a periodicity of 80 ms. TBS for SystemInformationBlockType1-BR and the repetitions made within 80 ms are indicated via schedulingInfoSIB1-BR in MIB.

The SystemInformationBlockType1-NB (SIB1-NB) uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period (see TS 36.213 [23]). TBS for SystemInformationBlockType1-NB and the repetitions made within the 2560 ms are indicated by schedulingInfoSIB1 field in the MIB-NB.

In cases of BL UEs or UEs in CE, or NB-IoT, the UE considers the system information is not expected to be changed in a specific window since the system information is repetitively transmitted. The specific window is defined as a period between two adjacent boundaries which are used for system information for scheduling other SIBs. However, when Earthquake and Tsunami Warning System (ETWS), Commercial Mobile Alert Service (CMAS), or Extended Access Barring (EAB) scheduling is configured in the specific window, the contents of system information for scheduling other SIBs (e.g. SIB1, SIB-BR) are changed in the specific window after receiving ETWS/CMAS/EAB scheduling.

In the legacy system, since the UE does not know whether SIB1 content is changed in the next window, the UE discards the accumulated information received in the current window at the time of receiving the changed SIB1 content (i.e. at time of receiving ETWS/CMAS/EAB scheduling), and newly attempts accumulation in the next window.

If the SIB1 content changed in the current window is changed in the next window, it may not be a big problem. However, if the SIB1 content changed in the current window is not changed in the next window, discarding the already received SIB1 content may cause the SIB1 to decode to take a relatively long time. Long time decoding is overhead on the MTC/NB-IOT UE. In this case, not discarding the already received SIB1 content may be more advantageous in decoding.

Therefore, the network needs to explicitly or implicitly inform BL UEs or UEs in CE, or NB-IoT UEs whether SIB1 content changes in the next window. In addition, if an indicator indicating whether the SIB1 content is changed from the base station is received, the UE needs a new mechanism to use the changed SIB1 content in the current window without discarding it.

Figure 8:
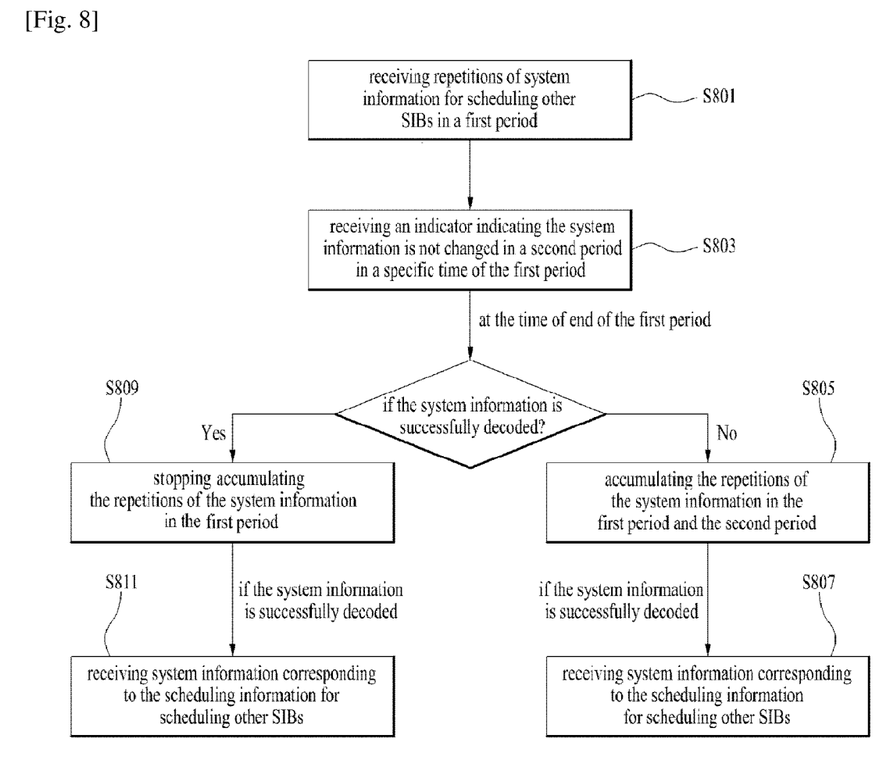
FIG. 8 is a conceptual diagram for processing system information for Machine-Type communication system according to embodiments of the present invention.

FIG. 8 is a conceptual diagram for processing system information for Machine-Type communication system according to embodiments of the present invention.

The UE receives repetitions of system information for scheduling other System Information Blocks (SIBs) in a first period (S801).

Preferably, the UE is one of BL UEs or UEs in CE, or NB-IoT UEs.

Preferably, system information for scheduling other System Information Blocks (SIBs) is SystemInformationBlockType1, SystemInformationBlockType1-BR (defined for low complexity UE and/or any UEs using coverage enhancement. The above type of UEs is required to read SystemInformationBlockType1-BR instead of SystemInformationBlockType1), or SystemInformationBlockType1-NB (defined for NB-IOT UE).

Preferably, the (first) period is defined as a period between two adjacent boundaries which are used for system information for scheduling other SIBs. During the period, the system information is not expected to be changed. The example of boundaries can be defined by SFN values for which SFN mod 512=0 in case of SystemInformationBlockType1-BR.

Within the above mentioned period, the system information for scheduling other SIBs uses a fixed schedule with a periodicity of certain time (e.g. 80 ms) and repetitions made within the certain time. Within this period, transmission and repetitions are scheduled in a fixed/configured subframes.

The UE receives an indicator indicating the system information for scheduling other SIBs is not changed in a second period followed by the first period in a specific time of the first period (S803).

The network may indicate whether the system information for scheduling other SIBs is changed or not in the second period, or indicate that the system information for scheduling other SIBs is not changed in the second period, or indicate that the system information for scheduling other SIBs is changed in the second period. This indication can be signalled via physical layer.

Alternatively, when the UE receives one of ETWS indication, CMAS indication, or EAB indication via a paging message, the UE considers that the indicator indicating the system information for scheduling other SIBs is not changed in the second period is received.

As mentioned above, the UE considers that the contents of the system information can change during the first period due to Scheduling of ETWS (e.g. SIB10, SIB11), or Scheduling of CMAS (e.g. SIB12), or Scheduling of EAB (e.g. SIB14). Since the contents of the system information change in the first period, the UE discards the currently accumulated system information before receiving the ETWS/CMAS/EAB scheduling and start to read system information newly after when receiving the ETWS/CMAS/EAB scheduling.

In this case, the network may implicitly indicate the system information for scheduling other SIBs is not changed in the second period using the ETWS/CMAS/EAB scheduling. This indication can be signaled via paging message (e.g. cmas-Indication as defined in TS36.331) or physical layer channel (e.g. on paging occasion) in a specific time of the first period.

If the system information for scheduling other SIBs is not successfully decoded at the time of end of the first period, the UE processes the system information for scheduling other SIBs based on the repetitions of the system information accumulated from the specific time of the first period (S805).

After receiving the repetitions of the system information until the end of the window, if the UE does not decodes the system information, the UE determines to combine the system information in the second period with the currently accumulated system information. In other words, the UE determines to accumulate across the period.

Alternatively, if the UE receives the indication for ETWS, CMAS and/or EAB after a configured threshold time from a start time point of the first period, the UE determines to combine the system information in the second period with the currently accumulated system information. The configured threshold time can be configured or fixed.

If the elapsed time from the start of the first period to the moment of receiving the indication for ETWS, CMAS and/or EAB is less than configured threshold time, this means that the remaining time is enough for the UE to decode the system information relevant for scheduling of other SIBs.

Alternatively, after receiving the indication for ETWS, CMAS and/or EAB, the UE fails to decode the system information within the first period and the UE does not receive the maximum number of repetitions of the system information until the end of the current window, the UE determines to combine the system information in the second period with the currently accumulated system information. The maximum number is acquired by MIB or the number is fixed.

When the UE processes the system information for scheduling other SIBs based on the repetitions of the system information accumulated from the specific time of the first period, the UE checks whether or not the system information for scheduling other SIBs is successfully decoded at time of end of the first period, and continuously accumulates the repetitions of the system information from the specific time of the first period in addition to repetitions of the system information accumulated in the second period if the system information for scheduling other SIBs is not successfully decoded, and decodes the system information for scheduling other SIBs based on the repetitions of the system information accumulated from the specific time of first period to a time of end of the second period.

The UE combines/decodes the system information for scheduling other SIBs regardless of the current period boundary (i.e. the UE does not discard the accumulated repetitions of the system information acquired within the current period). The UE accumulates across the across the windows until the UE successfully decodes the system information, or receiving the maximum number of repetitions of the system information. (The maximum number is acquired by MIB or the number is fixed), or the end of the second period.

If the UE successfully decodes the system information, the UE stops reading/combining the repetitions of the system information even if the number of accumulated/combined repetitions is less than the above maximum number of repetitions of the system information or it has not reached to the end of the second period.

And the UE receives system information corresponding to the scheduling information for scheduling other SIBs if the scheduling information for scheduling other SIBs is successfully processed (S807).

If the system information for scheduling other SIBs is successfully decoded at time of end of the first period, the UE stops accumulating the repetitions of the system information in the first period (S809), and receives system information corresponding to the scheduling information for scheduling other SIBs (S811).

When the network indicates that the system information for scheduling other SIBs is changed in the second period, or the UE doesn't receive the indicator, the UE discards the accumulated repetitions of the system information at the end of the first period, and the UE starts to accumulate the repetitions of the system information in the second period to try to read/combine/decode the system information from the start of the second period newly, if the system information for scheduling other SIBs is not successfully decoded at the time of end of the first period. Otherwise, the UE receives system information corresponding to the scheduling information for scheduling other SIBs.

Figure 9:
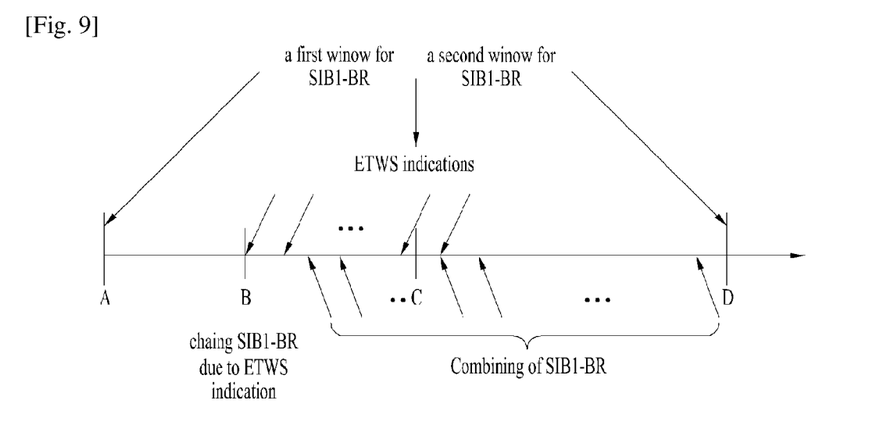
FIG. 9 is an example for processing system information for Machine-Type communication system according to embodiments of the present invention.

FIG. 9 is an example for processing system information for Machine-Type communication system according to embodiments of the present invention.

When UE receives repetitions of SIB1-BR from a time A to C, the UE receives ETWS indication at time B. Due to ETWS indication, SIB1-BR is changed from the time B. In this case, the UE can receive same content of SIB1-BR from a time B to D. The UE doesn't discard SIB1-BR received from the time B to C, and decodes SIB1-BR based on SIB1-BR received from the time B to D.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a user equipment (UE) operating in a wireless communication system, the method comprising:
   receiving, in a first period, repetitions of system information for scheduling other System Information Blocks (SIBs);
   receiving, at a specific time in the first period, information for informing that the system information for scheduling the other SIBs is not changed in a second period following the first period;
   receiving a Master Information Block (MIB) including information regarding a maximum number of repetitions of the system information;
   determining whether the system information for scheduling the other SIBs is successfully decoded by an end time of the first period; and
   based on the system information for scheduling the other SIBs not being successfully decoded:
      accumulating the repetitions of the system information, including repetitions of the system information accumulated in the second period, from the specific time in the first period until the maximum number of repetitions is reached;
      decoding the system information for scheduling the other SIBs, based on the repetitions of the system information accumulated from the specific time in the first period to an end time of the second period;
      based on the system information being successfully decoded before the maximum number of repetitions is reached: terminating the accumulation of the repetitions of the system information; and
      based on the system information not being successfully decoded by a time the maximum number of repetitions is reached: (i) discarding the repetitions of the system information that were accumulated until the maximum number of repetitions is reached;
   and (ii) starting to newly accumulate the repetitions of the system information in the second period.

2. The method according to claim 1, wherein receiving the information for informing that that the system information for scheduling the other SIBs is not changed in the second period comprises:
   receiving one of Earthquake and Tsunami Warning System (ETWS) indication, Commercial Mobile Alert Service (CMAS) indication, or Extended Access Barring (EAB) indication via a paging message.

3. The method according to claim 1, wherein the system information for scheduling other SIBs is one of SystemInformationBlockType1, SystemInformationBlockType1-BR, or SystemInformationBlockType1-NB.

4. The method according to claim 1, wherein, based on the system information for scheduling other SIBs being successfully decoded at the end time of the first period, the UE stops accumulating the repetitions of the system information in the first period and receives system information corresponding to the scheduling information for scheduling the other SIBs.

5. The method according to claim 1, further comprising:
   receiving, at the specific time in the first period, information for informing that the system information for scheduling other SIBs is changed in the second period;
   discarding the repetitions of the system information that were accumulated in the first period, and starting to accumulate the repetitions of the system information in the second period, based on the system information for scheduling the other SIBs not being successfully decoded at the end time of the first period; and
   receiving system information corresponding to the scheduling information for scheduling the other SIBs based on the system information for scheduling other SIBs being successfully decoded at the end time of the first period.

6. The method according to claim 1, wherein the UE is capable of communicating with at least one of another UE, a UE related to an autonomous driving vehicle, a base station and/or a network.

7. A User Equipment (UE) configured to operate in a wireless communication system, the UE comprising:
   a Radio Frequency (RF) module; and
   a processor operably coupled with the RF module and configured to:
   receive, in a first period, repetitions of system information for scheduling other System Information Blocks (SIBs);
   receive, at a specific time in the first period, information for informing that the system information for scheduling the other SIBs is not changed in a second period following the first period; and
   receive a Master Information Block (MIB) including information regarding a maximum number of repetitions of the system information;
   determine whether the system information for scheduling the other SIBs is successfully decoded by an end time of the first period; and
   based on the system information for scheduling the other SIBs not being successfully decoded:
      accumulate the repetitions of the system information, including repetitions of the system information accumulated in the second period, from the specific time in the first period until the maximum number of repetition is reached; and
      decode the system information for scheduling the other SIBs based on the repetitions of the system information accumulated from the specific time in the first period to an end time of the second period,
      based on the system information being successfully decoded before the maximum number of repetitions is reached: terminate the accumulation of the repetitions of the system information; and
      based on the system information being not successfully decoded by a time the maximum number of repetitions is reached: (i) discarding the repetitions of the system information that were accumulated until the maximum number of repetitions is reached;

and (ii) starting to newly accumulate the repetitions of the system information in the second period.

8. The UE according to claim 7, wherein receiving the information for informing that that the system information for scheduling the other SIBs is not changed in the second period comprises:

receiving one of ETWS indication, CMAS indication, or EAB indication via a paging message.

9. The UE according to claim 7, wherein the system information for scheduling other SIBs is one of SystemInformationBlockType1, SystemInformationBlockType1-BR, or SystemInformationBlockType1-NB.

10. The UE according to claim 7, wherein based on the system information for scheduling other SIBs being successfully decoded at the end time of the first period, the UE stops accumulating the repetitions of the system information in the first period and receives system information corresponding to the scheduling information for scheduling the other SIBs.

11. The UE according to claim 7, wherein the processor is further configured to:

receive, at the specific time in the first period, information for informing that the system information for scheduling other SIBs is changed in the second period, discard the repetitions of the system information that were accumulated in the first period and start to accumulate the repetitions of the system information in the second period, based on the system information for scheduling the other SIBs not being successfully decoded at the time of end time of the first period, and receive system information corresponding to the scheduling information for scheduling the other SIBs based on the system information for scheduling other SIBs being successfully decoded at the end time of the first period.

12. The UE according to claim 7, wherein the UE is capable of communicating with at least one of another UE, a UE related to an autonomous driving vehicle, a base station and/or a network.

* * * * *